United States Patent [19]

Yamaoka

[11] 4,428,451

[45] Jan. 31, 1984

[54] COOLING SYSTEM FOR A MOTORCYCLE

[75] Inventor: Yusaku Yamaoka, Iwata, Japan

[73] Assignee: Yamaha Hatsudoki Kabushiki Kaisha, Iwata, Japan

[21] Appl. No.: 351,447

[22] Filed: Feb. 23, 1982

[30] Foreign Application Priority Date

Feb. 25, 1981 [JP] Japan ........................................ 56-26351

[51] Int. Cl.³ ...................... B60K 11/04; B60K 13/04; B60K 15/02

[52] U.S. Cl. .............................. 180/229; 123/65 EM; 165/41; 180/68 R; 181/240; 181/249; 280/5 H

[58] Field of Search ..................... 180/229, 219, 54 A, 180/54 R, 68 R, 68 P; 184/104 B; 280/281 R, 281 LP, 281 B, 5 R, 5 A, 5 H; 165/41, 42; 237/28, 33; 123/196 AB, 65 EM, 41.48; 60/272, 312, 314, 320, 322, 324; 181/240, 249, 268

[56] References Cited

U.S. PATENT DOCUMENTS 4,226,296 10/1980 Higaki ................................ 180/219
4,237,996 12/1980 Matsuda et al. .................... 180/229

FOREIGN PATENT DOCUMENTS 54-52239 4/1979 Japan .................................. 180/229
55-78122 6/1980 Japan .................................. 180/229

*Primary Examiner*—Joseph F. Peters, Jr.
*Assistant Examiner*—Mitchell J. Hill
*Attorney, Agent, or Firm*—Ernest A. Beutler

[57] ABSTRACT

Several embodiments of water cooled motorcycles incorporating an improved compact arrangement wherein the components do not interfere with each other or the rider's stance. In each embodiment the engine cooling system includes a heat exchanger that is positioned on one side of the frame adjacent the down tube. An exhaust system is incorporated that includes an expansion chamber that is disposed on the opposite side of the down tube and which is connected to the engine by a U-shaped section of sufficient length so as to provide the desired exhaust performance. In some embodiments the cooling capacity is increased by employing multiple radiator sections. In each embodiment the side-to-side balance of the motorcycle is maintained by the positioning and sizing of the components.

18 Claims, 6 Drawing Figures

COOLING SYSTEM FOR A MOTORCYCLE

BACKGROUND OF THE INVENTION

This invention relates to a motorcycle, and more particularly to an improved layout for certain components of the engine that will provide good performance without loss of balance.

It is well known that the performance of a motorcycle, particularly those embodying two-cycle engines, can be improved if the exhaust system is provided with an enlarged, expansion chamber at a predetermined distance from the exhaust port of the engine. However, because of the small size of a motorcycle, it is frequently difficult to position the expansion chamber and interconnecting exhaust pipe at this optimum location without interfering with either other components of the motorcyle or with the rider's position on the motorcyle. For example, if the motorcyle is of the water cooled type, it is difficult to position both the expansion chamber, interconnecting exhaust pipe and the cooling radiator in locations where the balance of the motorcycle is not affected and/or the flow of cooling air across the radiator is not obstructed by either the expansion chamber or other components of the motorcycle. If the expansion chamber is positioned at a forward location where it will be clear of the rider, it has tended to obstruct the radiator with previously proposed constructions. On the other hand, if the expansion chamber is positioned rearwardly of the radiator, it will interfere with the rider's position.

It is, therefore, a principal object of this invention to provide an improved layoff for a motorcyle that permits the components to be positioned clear of the rider and yet not interfere with each other's operation.

It is a further object of this invention to provide a compact motorcyle layout in which the components do not interfere with each other or with the rider and the balance of the motorcyle is also not disturbed.

SUMMARY OF THE INVENTION

A first feature of this invention is adapted to be embodied in a motorcyle having a frame assembly including a down tube, and engine supported by the frame assembly, a heat exchager for cooling a liquid of the engine and an exhaust pipe. In accordance with this feature of the invention, the heat exchanger is positioned on one side of the down tube and an expansion chamber is positioned in part contiguous to the other side of the down tube. The exhaust pipe has a first portion that extends downwardly from the engine toward the ground and a second portion that extends upwardly from the end of the first portion toward the expansion chamber.

Another feature of this invention is also adapted to be embodied in a motorcycle. In accordance with this feature of the invention, the motorcyle has a frame assembly comprised of a head tube, a down tube, an engine supported by the frame assembly and a fuel tank supported by the frame assembly and extending transversely on opposite sides of the head tube. A heat exchanger is provided for cooling a liquid of the engine. In accordance with this feature of the invention, the heat exchanger is positioned on one side of the head tube and the fuel tank has a recess in its forwardmost portion on the one side of the head tube for clearance of the radiator and for maintaining balance.

DETAILED DESCRIPTION OF THE PREFERRED EMBODIMENTS

Figure 2:
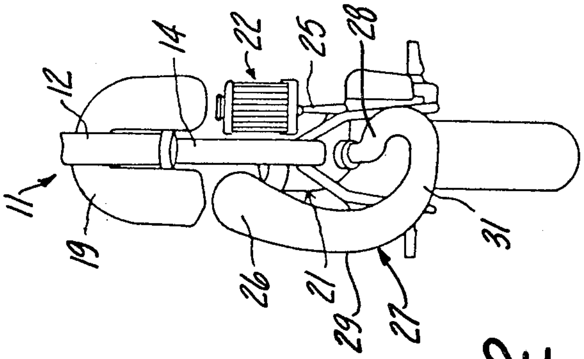
FIG. 2 is a front plan view of the motorcycle.
Figure 1:
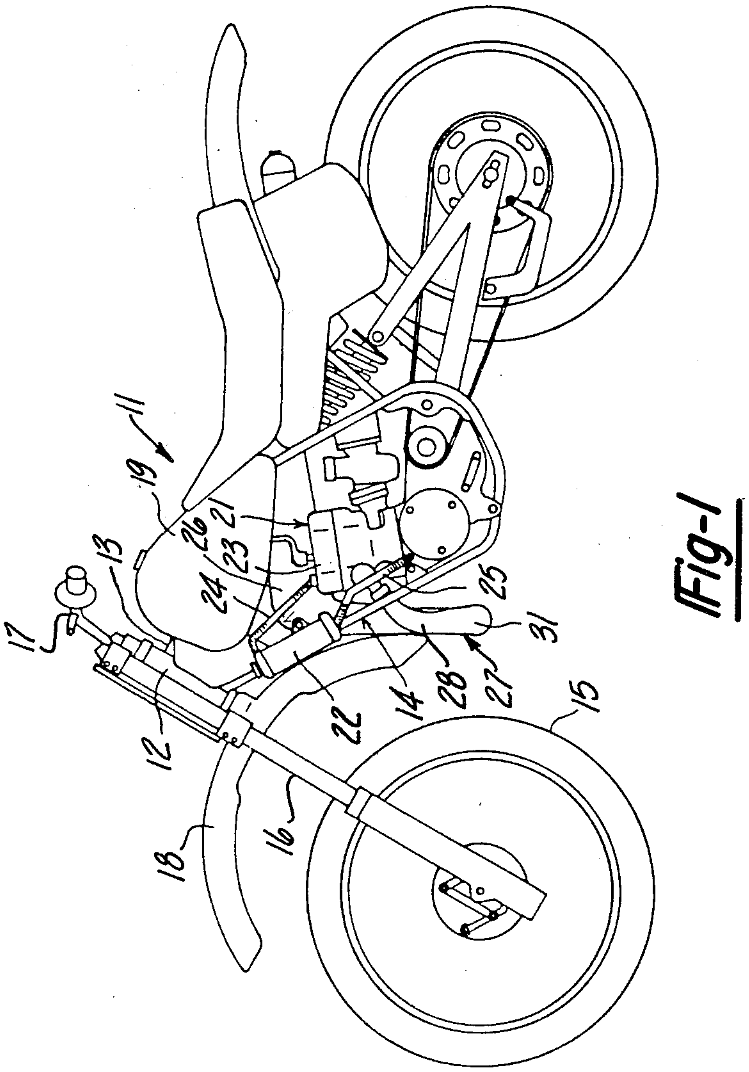
FIG. 1 is a side elevational view of a motorcycle constructed in accordance with a first embodiment of the invention.

Referring first to FIGS. 1 and 2, a motorcycle constructed in accordance with a first embodiment of this invention is identified generally by the reference numeral 11. The motorcycle 11 includes a frame assembly that inculdes a head tube 12, a main tube 13, and a down tube 14. The frame assembly includes additional tubes, however, since the invention is primarily related to the relationship of certain of the running components to the head tube 12, main tube 13 and down tube 14, the remainder of the frame assembly will not be described in any detail.

A front wheel 15 is supported by the head tube 12 by means including a front fork 16 and handlebar 17 for steering of the front wheel 15 in a known manner. A front fender 18 extends around a portion of the front wheel 15.

A saddle-shaped fuel tank 19 is supported on the frame assembly contiguous to the head tube 12 and extends around the major portion of the main tube 13.

The motorcylce 11 is provided with a driving engine, indicated generally by the reference numeral 21, which in the illustrated embodiment is of the single cylinder, two-cycle water cooled type. To provide the water cooling a radiator or heat exchanger 22 is supported by the down tube 14 at one side thereof in any suitable manner. The tubes of the radiator 22 extend generally vertically, however, lie parallel to the down tube 14. Because of the angular disposition of the radiator 22, it is possible to provide a greater air flow area across its tubes for a given vertical height. Coolant is delivered from the engine cylinder head 23 to the radiator 22 by means of a water pipe 24. The coolant is returned to the engine 21 from the radiator 22 by means of a coolant return pipe 25 that extends to the water pump of the engine so that the collant can be circulated through the engine 21 and radiator 22.

In accordance with the invention, the engine 21 is provided with an exhaust system which includes an expansion chamber 26. In accordance with the invention, the expansion chamber 26 is positioned on the side of the down tube 14 opposite to the radiator 22 and in close proximity to the down tube 14. The expansion chamber 26 runs rearwardly of the motorcycle 11 beneath the fuel tank 19 so that it will not interfere with the rider's seating position.

As is well knwon, it is necessary to place the expansion chamber 26 in communication with the exhaust port of the engine 21 by means of an exhaust pipe of a specific length. By employing an expansion chamber and a specific length interconnecting exhaust pipe, the performance of the engine 21 may be substantially improved. In order to achieve the necessary length in accordance with this invention, an exhaust pipe, indicated generally by the reference numeral 27, is provided for interconnecting the exhaust port of the engine 21 with the expansion chamber 26. The exhaust pipe 27 includes a first part 28 that extends from the engine exhaust port in a generally downward direction contiguous to the down tube 14. At its lower end, the exhaust pipe part 28 is connected to a second, upwardly extending part 29 by means of an intermediate section 31. The upwardly extending part 29 terminates at the expansion chamber 26. Thus, by using the parts 28, 29 and intermediate section 31 the necessary length may be achieved without interfering with the rider position or obstructing the air flow across the radiator 22. Furthermore, the positioning of the expansion chamber 26 on one side of the motorcyle 11, and specifically on one side of the down tube 14 and the radiator 22 on the other side, permits the balance of the motorcycle from side to side to be maintained.

Figure 4:
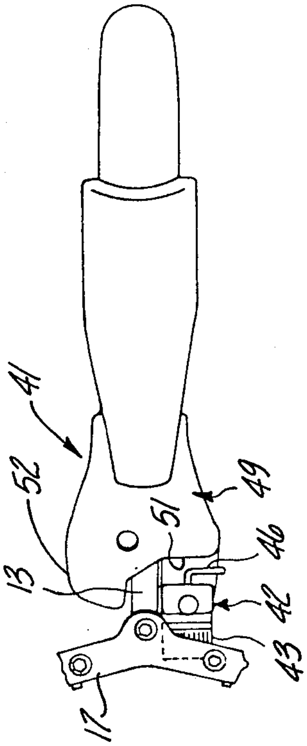
FIG. 4 is a top plan view of the motorcycle shown in FIG. 3.
Figure 3:
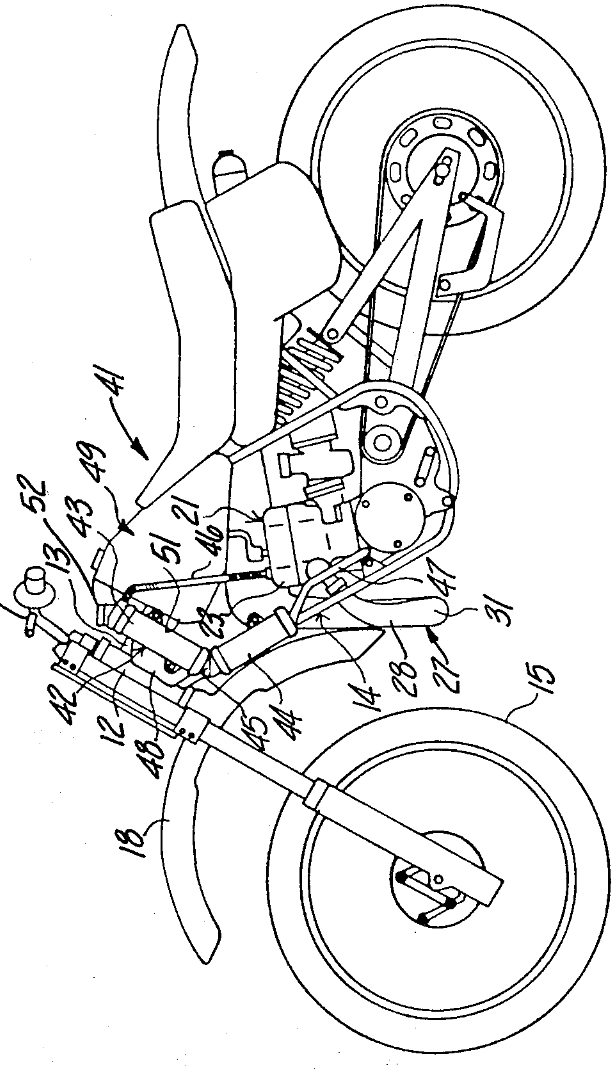
FIG. 3 is a side elevational view of a motorcycle constructed in accordance with a second embodiment of the invention.
Figure 5:
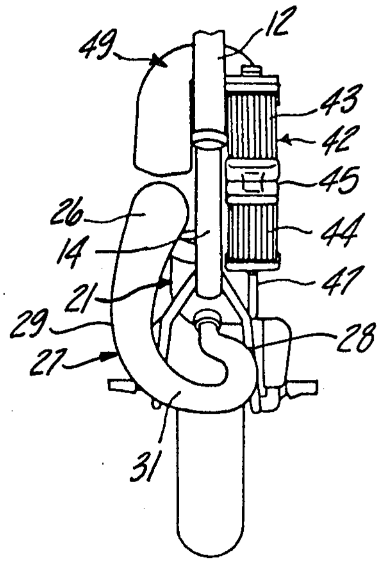
FIG. 5 is a front elevational view of the embodiment of FIGS. 3 and 4.

In FIGS. 3 through 5 a motorcycle constructed in accordance with a second embodiment of this invention is identified generally by the reference numeral 41. The motorcycle 41 has a frame assembly, engine, and exhaust system of the same configuration as in the embodiment of FIGS. 1 and 2. FOr that reason components which are the same have been identified by the same reference numerals and will not be described again, except insofar as is necessary to understand this embodiment of the invention.

In the previously described embodiment the radiator 22 was provided with vertically extending tubes and was position to one side of, and supported by, the down tube 14. In accordance with this embodiment of the invention a radiator, indicated generally by the reference numeral 42, is provided which has an increased capacity from the previously described embodiment. The radiator 42 is comprised of an upper section 43 having vertically extending tubes and which is positioned contiguous to and on one side of the head tube 12. The radiator 42 also includes a lower section 44 that is positioned contiguous to and on one side of the down tube 14. The sections 43 and 44 have a generally V-shape in side elevation and their tubes are connected by an interconnecting tank 45. As with the previously described embodiment, coolant is delivered from the engine cylinder head 23 to the upper radiator section 43 by means of a coolant pipe 46. Coolant is returned to the engine 21 from the lower end of the lower radiator section 44 by means of a return pipe 47. In this embodiment a bracket 48 is affixed to the head tube 12 and supports the upper section 43 of the radiator 42. THe lower section 44 may be supported by the down tube 14 as in the previous embodiment.

In order to provide clearance for the upper radiator section 43 and to maintain balance due to the increased weight on the one side of the motorcylce 41 provided by the increased radiator size, a fuel tank, indicated generally by the reference numeral 49, is provided which has a recess, indicated generally at 51, on the side of the head tube 12 where the radiator section 43 lies. A forwardly extending projection 52 of the fuel tank 49 lies on the opposite side of the head tube 12 so as to provide sufficient capacity for the tank 49 and to provide a weight equivalent to that of the upper radiator section 43 so that the bike will be balanced from side to side. As with the previously described embodiment, the lower radiator section 44 is counterbalanced by the weight of the expansion chamber 26 and exhaust pipe 27.

Although the radiator sections 43 and 44 in this embodiment are connected by a tank 45, it should be readily apparent that pipes may be employed to interconnect the radiator sections 43 and 44. Alternatively, the sections 43 and 44 may be formed from the same tubes without any interconnecting tank or pipes. If this is done, however, it is desirable to place the tubes at a generally V-shaped angle so that they will extend generally parallelly to the respective head tube 12 and down tube 14. Although the tubes could run vertically, it is more desirable to provide a generally V-shape for the radiator 42 so as to provide a greater area that is exposed to the air flow than would be possible in a given vertical height were the tubes straight. In addition, the angular disposition of the upper radiator section 43 permits a smaller recess to be used in the fuel tank 49 than if this section extended vertically.

Figure 6:
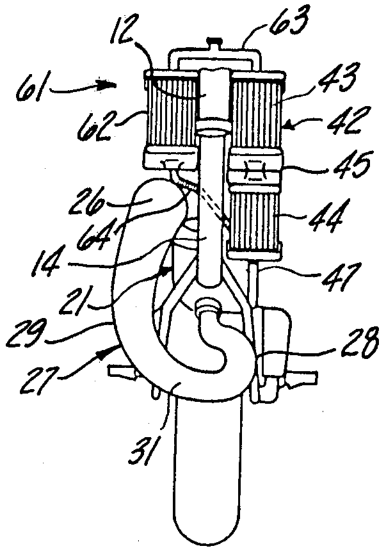
FIG. 6 is a front elevational view of a still further embodiment of the invention.

In FIG. 6 a motorcycle constructed in accordance with a still further embodiment of the invention is identified generally by the reference numeral 61. The motorcycle 61 is of similar construction to the embodiment of FIGS. 3 through 5, however, provides still additional cooling capacity. Because of its similarity to the embodiment of FIGS. 3 through 5, the components which are the same have been identified by the same reference numeral and will not be generally described again.

In this embodiment, in addition to employing the two-section radiator 42 on the one side of the head tube 12 and down tube 14, a further radiator section, indicated by the reference numeral 62, is provided on the opposite side of the head tube 12. The radiator section 62 is disposed at an angle like the radiator section 43 on the opposite side of the head tube 12 so as to minimize the vertical heighth relative to its air flow area and also so as to minimize the amount of recess necessary to clear the radiator 62 in the fuel tank. In this embodiment both sides of the fuel tank (which is not shown) must be recessed to clear the two radiator sections. However, in this embodiment the radiator section 62 and radiator section 43 will substantially balance each other so that the side-to-side balance of the motorcycle 61 will be good.

In this embodiment coolant from the engine cylinder head is delivered to both radiator sections 43 and 42 by means of a Y pipe 63. Coolant is returned to the engine from the pipe 47 and from a pipe 64 that extends from the lower tank of the radiator section 62. In this embodiment the radiator section 62 is positioned above the expansion chamber 26 and, therefore, does not interfere with this expansion chamber. Furthermore, because of the use of the three radiator sections 43, 44 and 62, the individual sections may be made somewhat smaller than in the previously described embodiment and the amount of recess in the fuel tank required to clear the radiator sections may be reduced.

It should be readily apparent that each embodiment of the invention as disclosed permits the placement of the exhaust system expansion chamber in a location that the riding position is not interfered with and, furthermore, the flow through the radiators is not obstructed. Furthermore, in each embodiment an arrangement is insured that the side to side weight balance of the motorcycle is maintained. Thus, an extremely effective and compact arrangement is provide which will mazimize performance of both the cooling system and the engine and its exhaust system. Although three embodiments of the invention have been illustrated and further modifications described, it should be readily apparent to those skilled in the art that still further modifications may be made without departing from the spirit and scope of the invention, as defined by the appended claims.

I claim:

1. In a motorcycle having a frame assembly comprising a down tube, an engine supported by said frame assembly, a heat exchanger for cooling a liquid of the engine, and an exhaust pipe, the improvement comprising said heat exchanger being positioned on one side of said down tube, and including an exhaust expanison chamber positioned in part contiguous to the other side of said down tube, said exhaust pipe having a first portion extending downwardly from said engine toward the ground and a second portion extending upwardly from said first portion toward said exhaust expansion chamber and communicating with said exhaust expansion chamber.

2. A motorcycle as set forth in claim 1 wherein the first and second portion of the exhaust pipe are interconnected by a curved section.

3. A motorcycle as set forth in claim 1 wherein the heat exchanger is supported by the down tube.

4. A motorcycle as set forth in claim 3 wherein the first and second portion of the exhaust pipe are interconnected by a curved section.

5. A motorcycle as set forth in claim 1 wherein the heat exchanger comprises a first section juxtaposed to the down tube and a second section extending above the down tube.

6. A motorcycle as set forth in claim 5 wherein the first and second heat exchanger sections are disposed at an angle to each other.

7. A motorcycle as set forth in claim 5 wherein the frame assembly further includes a head tube connected to the down tube, one of the heat exchanger sections being juxtaposed to and supported by the head tube, and further including a saddle-shape fuel tank juxtaposed at its forward end to said head tube, said fuel tank having recess formed in the side thereof on the one side of the head tube for clearing the heat exchanger section and a forwardly extending portion on the other side thereof.

8. A motorcycle as set forth in claim 7 wherein the first and second heat exchanger sections are disposed at an angle to each other.

9. A motorcycle as set forth in claim 5 wherein the frame assembly further includes a head tube affixed to the down tube, the first and second heat exchanger sections being juxtaposed to the down tube and head tube respectively, and further including a third heat exchanger section supported on the other side of the head tube and above the expansion chamber.

10. A motorcycle as set forth in claim 9 wherein the first and second heat exchanger sections are disposed at an angle to each other.

11. A motorcycle as set forth in claim 10 wherein the second and third heat exchanger sections are supported by the head tube and the first heat exchanger section is supported by the down tube.

12. A motorcycle as set forth in claim 1 wherein the heat exchanger comprises first and second sections positioned on opposite sides of the frame and said second heat exchanger section being disposed above the expansion chamber.

13. In a motorcycle having a frame assembly comprising a head tube, a down tube, an engine supported by said frame assembly, a fuel tank supported by said frame assembly and extending transversely on opposite sides of said head tube, and a heat exchanger for cooling a liquid of the engine, the improvement comprising said heat exchanger being positioned on one side of said head tube and said fuel tank having a recess in its forwardmost portion on said one side of said head tube for clearing said heat exchanger.

14. A motorcycle as set forth in claim 13 wherein the fuel tank has a portion extending forwardly of the recess on the opposite side of the head tube of sufficient capacity to balance the weight of the heat exchanger.

15. A motorcycle as set forth in claim 13 wherein in the heat exchanger is comprised of first and second sections, the first section being juxtaposed to the head tube and the fuel tank recess and the second section being juxtaposed to the corresponding side of the down tube and beneath the fuel tank.

16. A motorcycle as set forth in claim 15 wherein the first and second heat exchanger sections are disposed at an angle to each other.

17. A motorcycle as set forth in claim 15 further including a third heat exchanger section disposed on the side of the head tube opposite to the first heat exchanger section.

18. A motorcycle as set forth in claim 17 wherein the first and second heat exchanger sections are disposed at an angle to each other.

* * * * *